Figure 1:
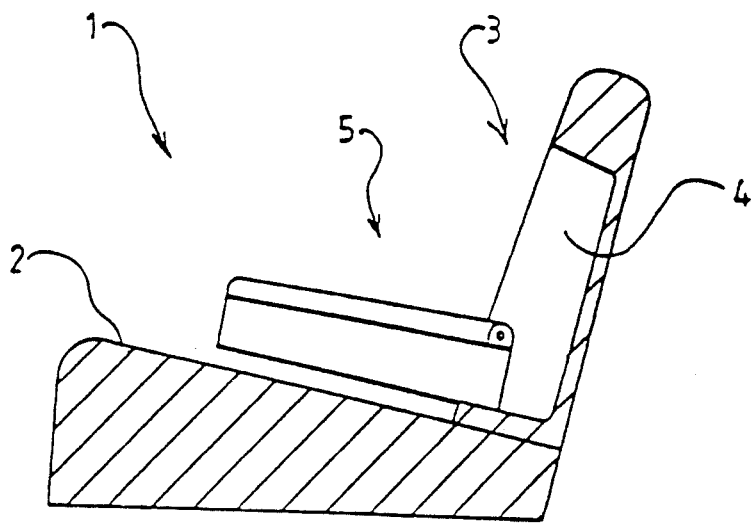

United States Patent [19]

Stig

[11] Patent Number: 5,205,608

[45] Date of Patent: Apr. 27, 1993

[54] CHILD SEAT FOLDABLE FROM WITHIN SEAT BACK HAVING EXTENSION CONTROL MECHANISM

[75] Inventor: Ingemar Stig, Alingsas, Sweden

[73] Assignee: General Engineering (The Netherlands) B.V., Utrecht, Netherlands

[21] Appl. No.: 802,283

[22] Filed: Dec. 4, 1991

[30] Foreign Application Priority Data

Dec. 4, 1990 [GB] United Kingdom ............... 9026339

[51] Int. Cl.⁵ ............................................ A47C 15/00
[52] U.S. Cl. ...................................... 297/238; 297/14; 297/113; 108/44
[58] Field of Search .................. 297/14, 238, 191, 113; 108/44

[56] References Cited

U.S. PATENT DOCUMENTS

| | | | |
|---|---|---|---|
| 1,802,620 | 4/1931 | Scully | 297/113 |
| 2,503,602 | 4/1950 | Titley | 108/44 |
| 3,951,448 | 4/1976 | Hawie | 297/238 X |
| 4,900,087 | 2/1990 | Crisp | 297/238 |
| 5,140,914 | 8/1992 | Bohbot et al. | 108/44 |

FOREIGN PATENT DOCUMENTS 2122886 1/1984 United Kingdom ............... 297/238

Primary Examiner—Kenneth J. Dorner
Assistant Examiner—James M. Gardner
Attorney, Agent, or Firm—Spencer, Frank & Schneider

[57] ABSTRACT

A seating arrangement for a motor car has a seat for occupation by an adult comprising a squab and a back. A child's seat is incorporated in the back of the adult seat and is movable from a retracted position, in which the child seat is accommodated within a recess formed in the back of the adult seat, to an operative position. The child seat has a squab which incorporates a mechanism adapted to move squab elements from an initial position to an operative position. The overall size of the squab when the squab elements are in the operative position is greater than the size when the squab elements are in the initial position. The mechanism is actuated on movement of a control member.

9 Claims, 6 Drawing Sheets

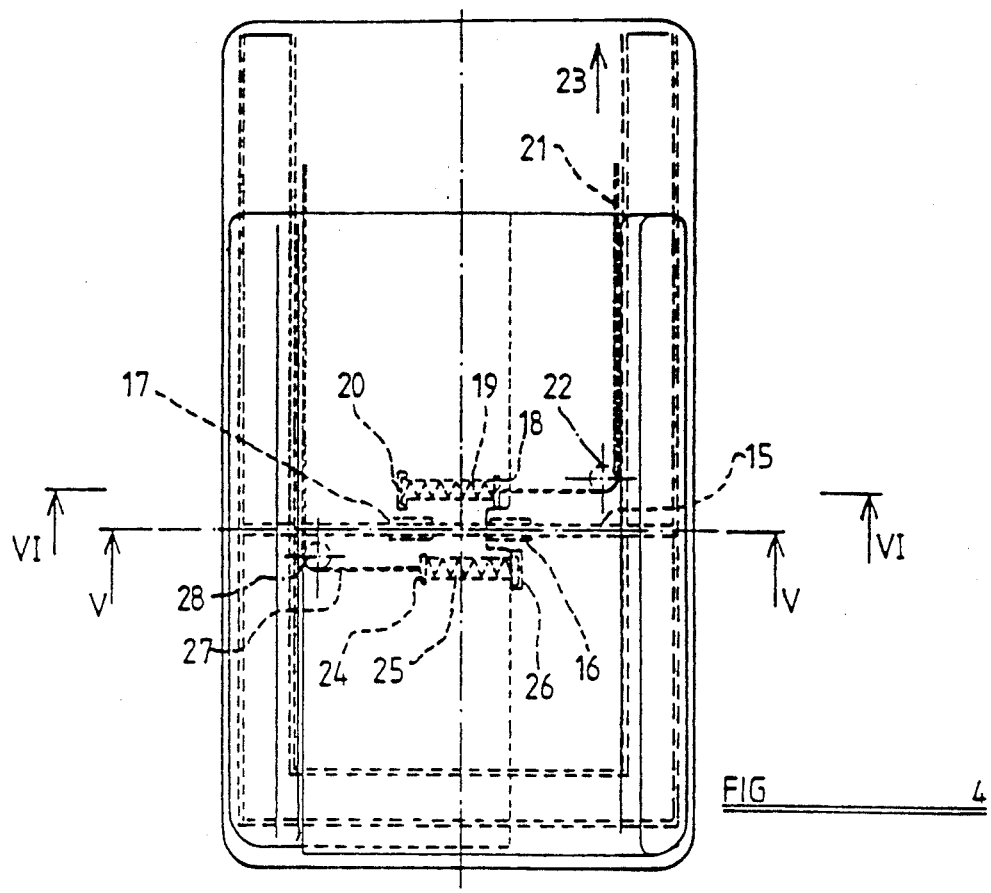
FIG 4
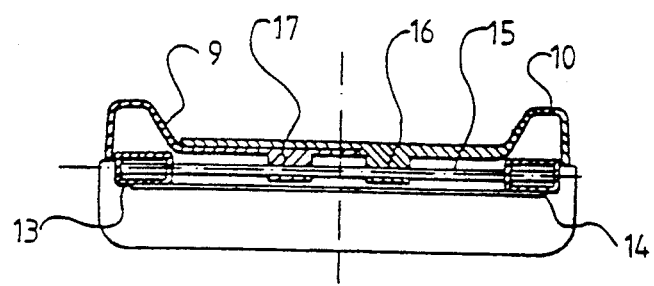
FIG 5
FIG 6
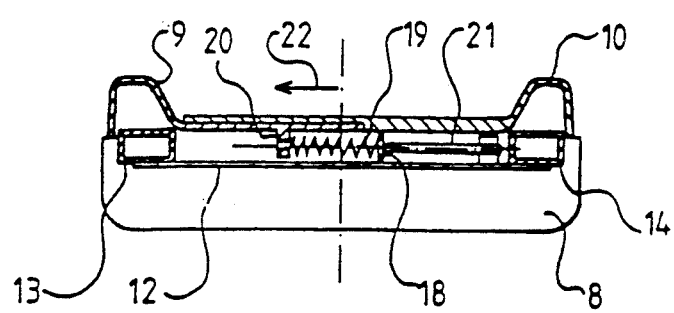

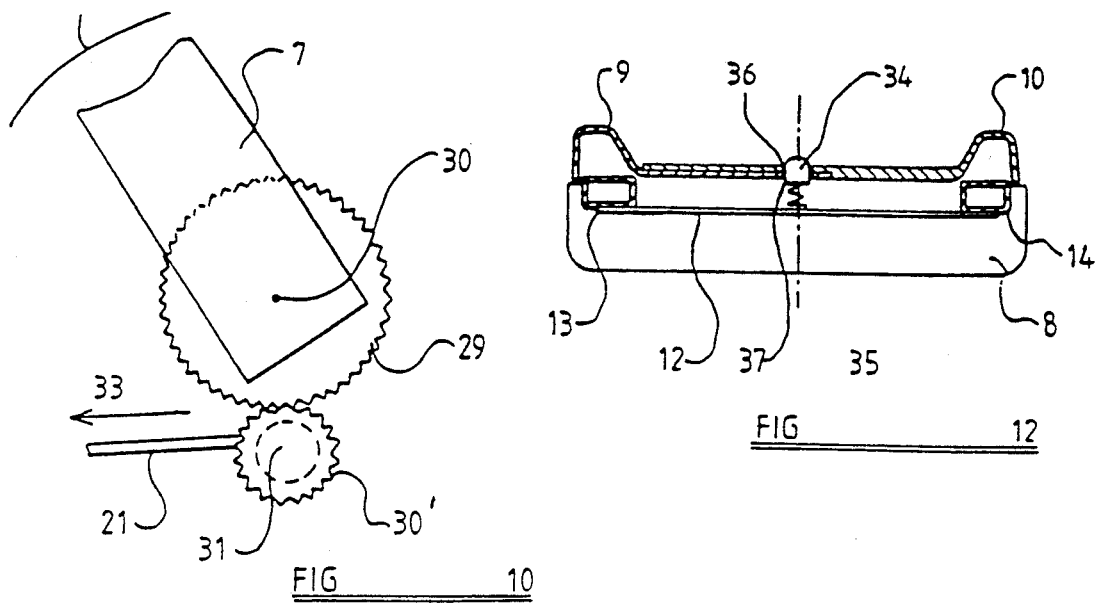
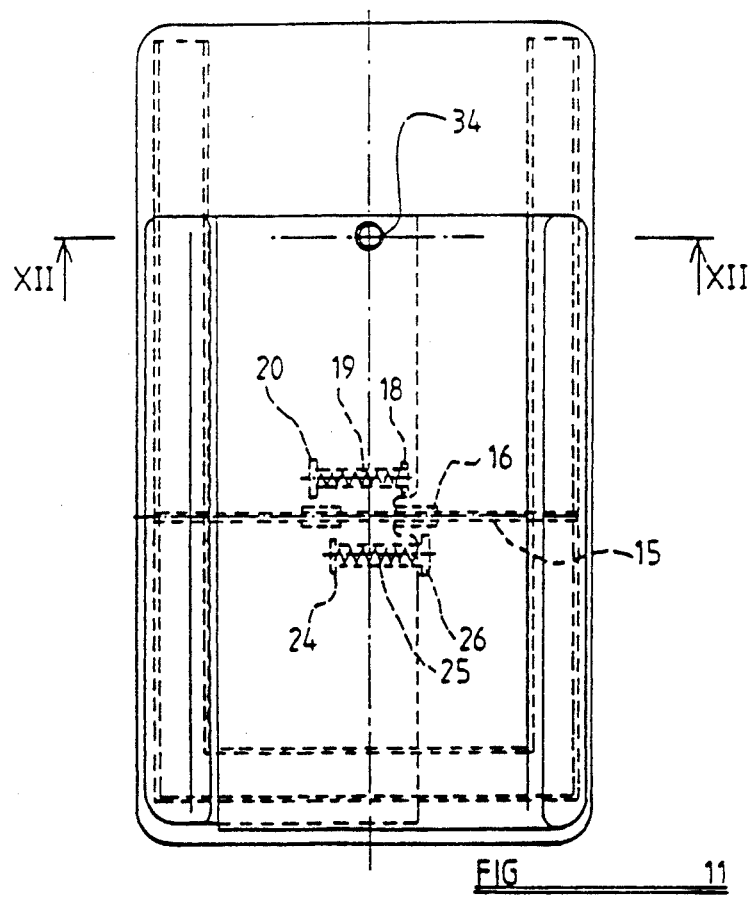

CHILD SEAT FOLDABLE FROM WITHIN SEAT BACK HAVING EXTENSION CONTROL MECHANISM

THE PRESENT INVENTION relates to a seating arrangement for a motor vehicle and, more particularly, relates to a seating arrangement intended primarily for use by adults but incorporating a child's safety-seat, the child's safety-seat ordinarily being in a retracted inoperative position, but being movable to an extended position when the child's safety-seat is to be utilised.

It has been proposed previously to provide a seating arrangement of the type outlined above, especially in the rear seat of a motor car where the child s safety-seat has been incorporated in a central arm rest. The arm rest has been movable from an retracted position, in which the arm rest is retained within a recess formed in the back of the seat, to a forwardly extending position, in which the arm rest can actually be utilised as an arm rest. An upper cover provided on the arm rest may then be moved upwardly to reveal the child's safety-seat, the upper cover of the arm rest forming the back of the child's safety-seat.

A disadvantage with a child's safety-seat of this type is that the squab of the child's seat only has a width which is equal to the width of the arm rest. Typically an arm rest has a relatively narrow width. The present invention seeks to provide an improved seating arrangement.

According to this invention there is provided a seating arrangement for a motor vehicle, the seating arrangement comprising a primary seat for occupation by an adult comprising a squab and a back, a child's seat being incorporated in the back of the primary seat, and being movable from the retracted position in which the child-seat is accommodated within a recess formed in the back of the primary seat, to an operative position, the child-seat presenting a squab incorporating a mechanism adapted to move squab elements from an initial position to an operative position, the overall size of the squab when the squab elements are in the operative position being greater than the size when the squab elements are in the initial position, the mechanism being actuated on movement of a control member.

Preferably the squab carries two squab elements which are each movable in a lateral sense relative to each other so that the overall width of the squab increases when said mechanism is actuated.

Conveniently the squab elements are each associated with a spring providing a lateral bias to the squab element.

Advantageously the squab elements are each provided with means engaging a guide element to guide the squab elements in their movement.

Preferably the guide element comprises a guide rod, and each squab element is provided with a lug engaging the guide rod.

Conveniently the said mechanism may be actuated by a further movement of the control member to move said squab elements from the operative position back to the initial position.

In one embodiment the control element comprises a back for the child's seat, the back being pivotally mounted relative to the squab of the child's seat.

Preferably each squab element is associated with a wire or cord or the like tending to draw the respective squab element to the initial or retracted position when tension is applied thereto, means being provided to apply tension to the cable in response to movement of the back of the child's seat away from the operative position thereof.

In another embodiment the control element comprises a press-button initially engaged in two aligned apertures formed in the squab elements.

Figure 2:
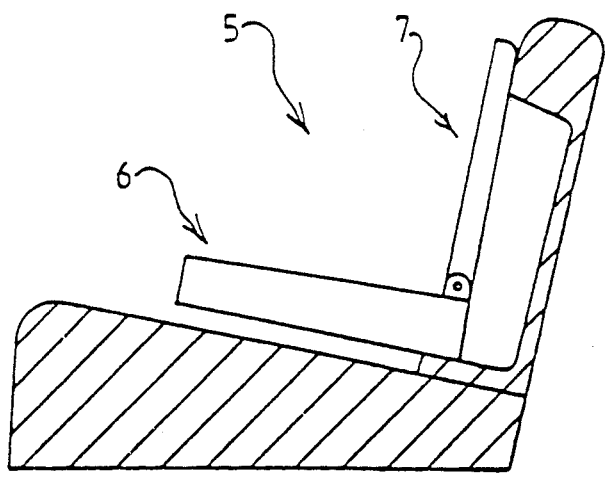
Figure 3:
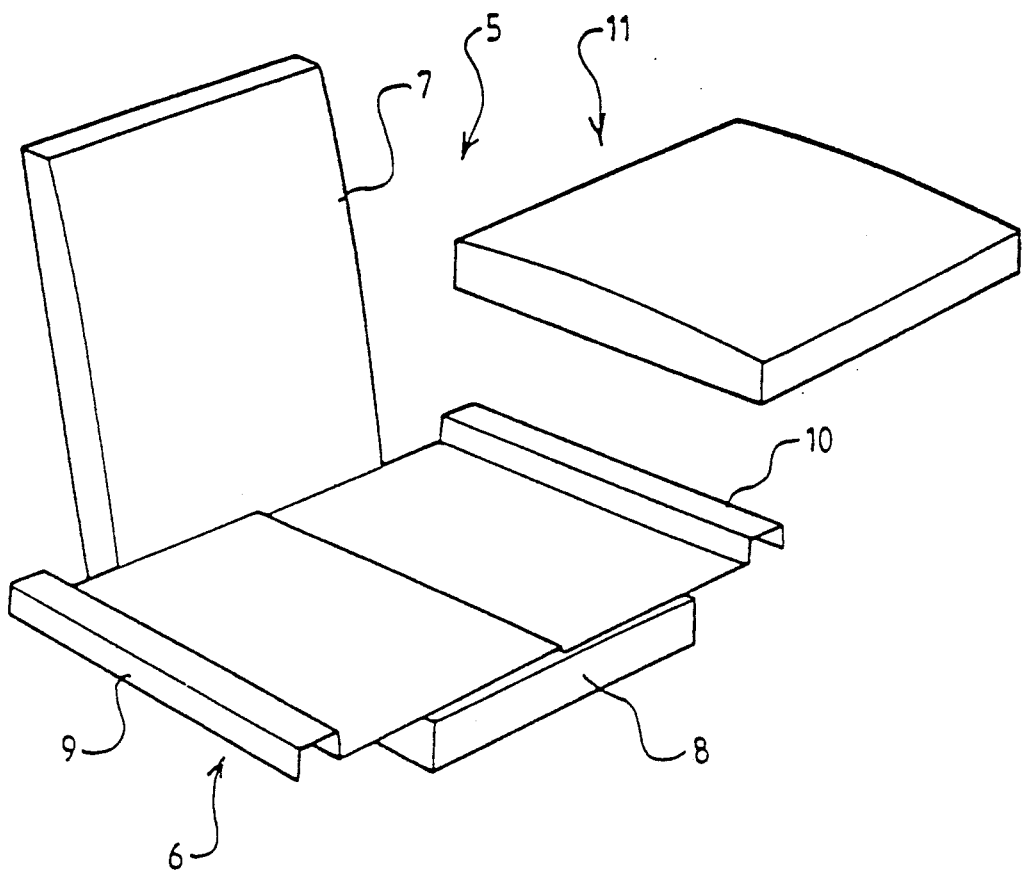
Figure 7:
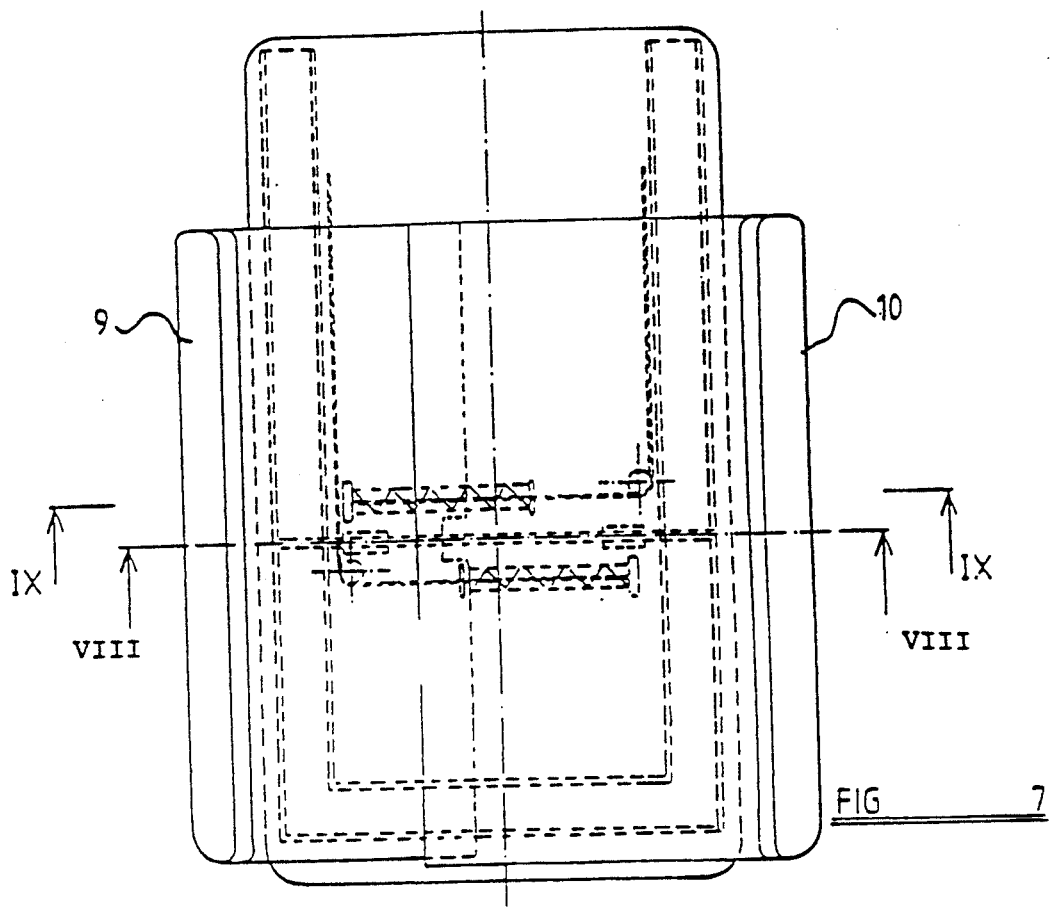
Figure 8:
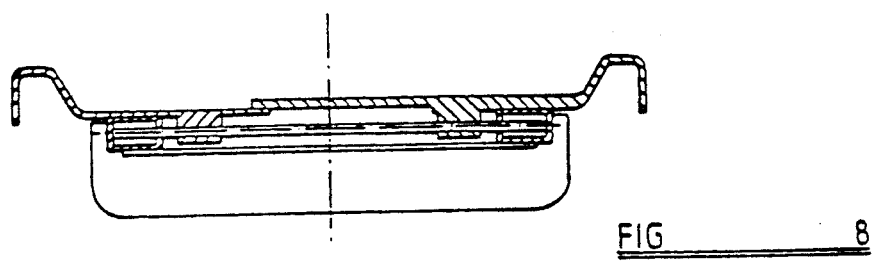
Figure 9:
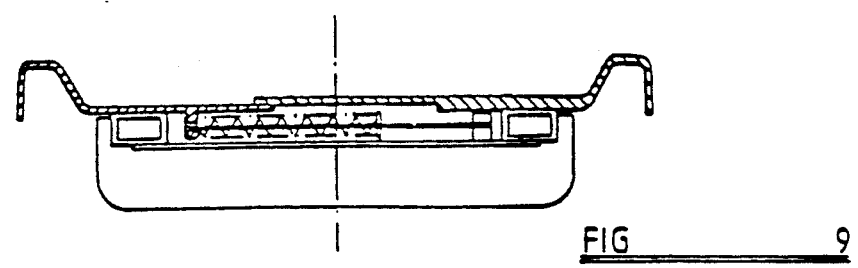
Figure 13:
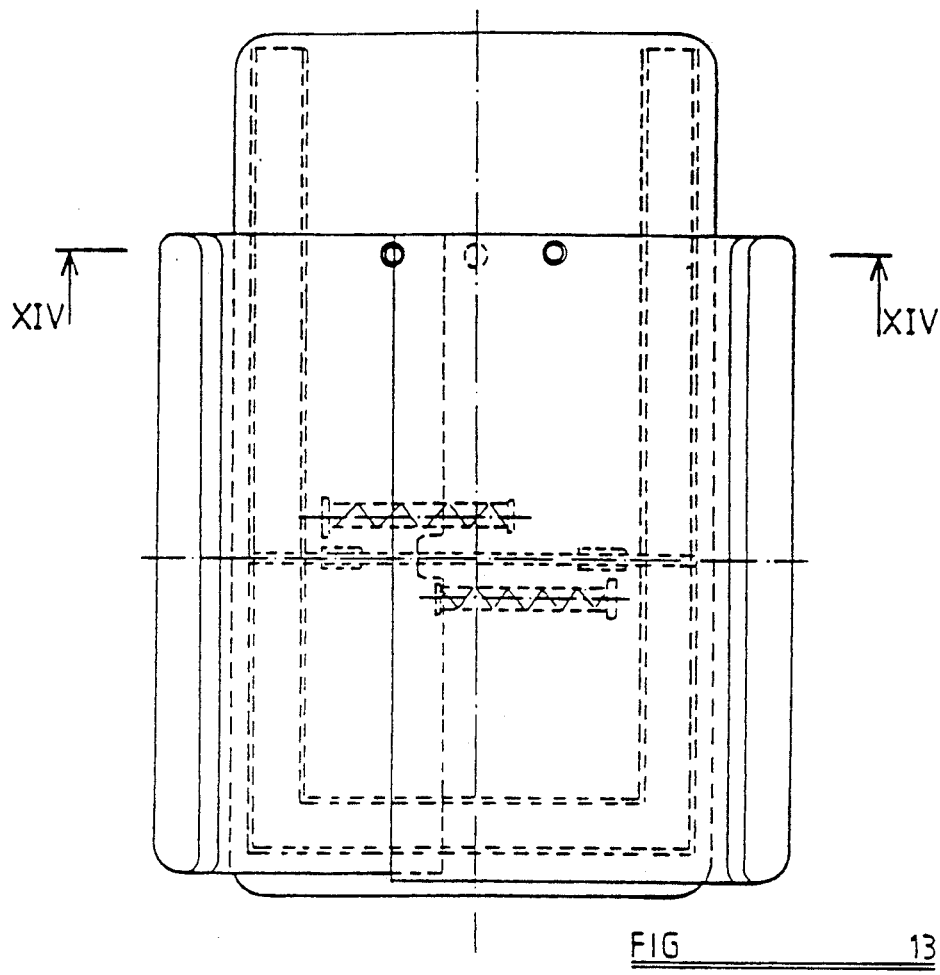
Figure 14:
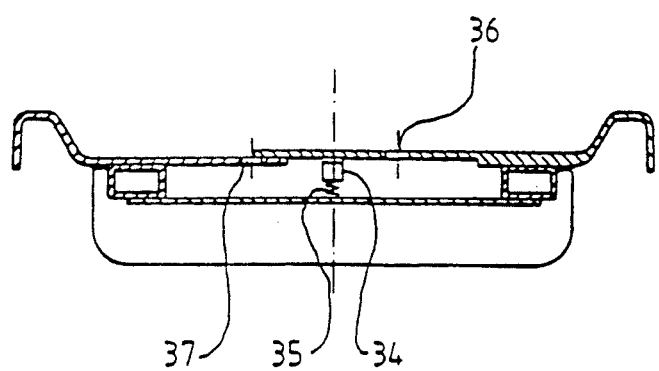

In order that the invention may be more readily understood, and so that further features thereof may be appreciated, the invention will now be described, by way of example, with reference to the accompanying drawings in which FIG. 1 is a diagrammatic sectional view of part of a seating arrangement in accordance with the invention in a first position, FIG. 2 is a view corresponding to FIG. 1 showing the seating arrangement in an alternative position, FIG. 3 is a perspective view illustrating the seating arrangement when virtually ready for use by a child, FIG. 4 is a plan view of a squab of a child's seat forming part of a seating arrangement of the invention, with parts thereof being shown in phantom, FIG. 5 is a sectional view taken on the line V—V of FIG. 4, FIG. 6 is a sectional view taken on the line VI—VI of FIG. 4, FIG. 7 is a view corresponding to FIG. 4 showing the seat in an alternative condition, FIG. 8 is a sectional view taken on the line VIII—VIII of FIG. 7, FIG. 9 is a sectional view taken on the line IX—IX of FIG. 7, FIG. 10 a scrap view of part of a mechanism forming part of the seating arrangement, particularly illustrated in FIGS. 4 to 7, FIG. 11 is a plan view of the squab of a child's seat forming part of an alternative embodiment of the invention, with parts shown in phantom, FIG. 12 is a sectional view taken on the line XII—XII of FIG. 11, FIG. 13 a view corresponding to FIG. 11 but showing the squab in an alternative condition, and FIG. 14 a sectional view taken on the line XIV—XIV of FIG. 13.

Referring initially to FIGS. 1 and 2 of the drawings, a seating arrangement in accordance with the invention comprises primarily an adult seat 1 having a squab 2 and a back portion 3. The back portion 3 defines a recess 4 which can receive a child's seat 5. The recess may be centrally located in the back 3 of the seat 1, so that the child's seat may also act as an arm rest, although it is to be understood that two child's seats may be provided in the back-seat of a motor vehicle, being located one towards each side of the motor car, so that two children can ride in the seats side-by-side.

As can be seen more clearly in FIG. 2, the child's seat 5 includes a squab 6 to which is pivotally connected a back part 7. The combination of the squab 6 and the back 7 may be received completely within the recess 4 so that the seat 1 may be used as an ordinary seat by an adult. The squab 6 and back 7 may be moved together to the position illustrated in FIG. 1, where the elements of the child's seat may act as an arm rest. However, the back part 7 of the child's seat 5 may be pivoted up, as shown in FIG. 2, to reveal the squab 6 of the child's seat.

Referring now to FIG. 3, the child's seat 5 is illustrated, showing the back 7 and the squab 6. It can be seen that the squab 6 consists of an underlying support 8 and two squab elements 9,10 which are mounted on the support 8 and which each have an overall width which is no greater than the width of the underlying support 8. The two squab elements 9,10 are movable laterally from an initial position to the illustrated extended position, in which the two squab elements 9,10 extend over the sides of the underlying support 8, thus effectively extending the width of the squab. A cushion 11 is provided to be mounted on the squab elements 9 and 10.

It will thus be appreciated that the underlying support 8 may have a relatively modest width and may thus, for example, have a width equivalent to the width of a conventional arm rest. Nevertheless, by virtue of the fact that the squab elements 9 and 10 may be moved to the illustrated position in which they extend over the sides of the squab 8, when in use, the squab may present an adequate width for use by a child.

FIGS. 4 to 9 illustrate one embodiment of a child-seat 5 of the type broadly described above. Referring to these figures it can be seen that the underlying support 8 carries a steel plate 12, the edges of which are re-inforced by tubular re-inforcing struts 13,14. The struts 13,14 are interconnected, as shown in FIG. 5, by a transversely extending bar 15 which is engaged by depending lugs 16,17 provided on the squab elements 9,10. The bar acts as a guide to guide a lateral sliding motion of the two squab elements 9,10.

A lug 18 is provided extending upwardly from the plate 12 as can be seen most clearly in FIG. 6. A helical spring 19 engages the lug and engages a further lug 20 depending from the squab element 9. A wire or cord 21 or the like extends from the lug 20, through the centre of the spring 19, through an aperture in the lug 18 and round a pulley-post 22. The wire 21 then extends towards the rear edge of the seat squab. It can be seen that the spring 19 exerts a force on the lug 20 in the direction of the arrow 22 (see FIG. 6) tending to move the squab element 9 towards the left. It can also be seen that if a tension is applied to the wire 21 in the direction of the arrow 23 (FIG. 4) the squab element 9 will be moved towards the right.

As can be seen in FIG. 4, a second lug 24 is provided on the plate 12 which is associated with a further spring 25 which engages a further depending lug 26 provided on the squab element 10. A wire, cord or the like 27 engages the lug 26, passes through the spring 25 and the lug 24, and passes round a pulley-post 28. It is to be understood that these components operate in exactly the same way as the previously described corresponding components associated with the squab element 9, and cause a movement of the squab element 10.

FIGS. 4 to 6 illustrate the squab elements 9 and 10 in an initial position in which the squab elements 9 and 10 have an overall combined width which is less than the width of the underlying support 8. FIGS. 7 to 8, however, corresponding directly with FIGS. 4 to 6 illustrate the squab elements 9 and 10 when in an extended condition.

FIG. 10 illustrates, schematically, the base of the rear 7 of the child's seat 5, illustrating a first relatively large gear wheel 29 which is connected to the back 7 of the seat so that the gear wheel 29 rotates when the seat-back 7 is moved pivotally about its pivot axis 30. Meshing with the gear wheel 29 is a smaller gear wheel 30' which is connected to a drive shaft 31 about which is wound one end of the wire 21. It can be seen that as the seat-back 7 is moved from an initial horizontal position to a substantially vertical position, in the direction indicated by the arrow 32, the wire 21 will be paid out in the direction of the arrow 33. Similarly when the seat-back 7 is returned to the horizontal position, the wire 21 will be drawn in. It will thus be appreciated that if a similar mechanism is provided associated with the cable 28, when the seat-back 7 of the child-seat 5 is raised, from an initial horizontal position (as illustrated in FIG. 1) then the squab elements 9 and 10 will move automatically in a lateral sense, thus increasing the width of the seat squab. However, when the back 7 of the child-seat 5 is moved from the vertical position (as illustrated in FIG. 2) to the horizontal position (as illustrated in FIG. 1) the squab elements 9 and 10 will be retracted to their initial condition in which the overall width of the combination of the squab elements 9 and 10 is less than the width of the underlying support 8, and then the entire child's seat 5 may be moved with an upwardly directed pivotal movement so that the child-seat 5 is totally accommodated within the recess 4 formed in the back 3 of the main seat 1.

It is to be understood, therefore, that the back of the child-seat 7 acts as a control element for controlling the mechanism which effects the relative movement between the squab elements and the underlying support.

FIGS. 11 to 14 illustrate a modified embodiment of the invention, having some features common with that described with reference to FIGS. 4 to 10. Like references will refer to like parts. In the embodiment of FIGS. 11 to 14 the underlying support 8 again carries a steel plate 12 provided with tubular reinforcing struts 13,14 at the edges of the plate. The squab elements 9,10 again have depending lugs 16,17 which engage the guide rod 15. The springs 19 and 25 which bias the squab elements 9,10, laterally are again provided, with their associated lugs 18,20 and 24,26 respectively, but no wires or cords are associated with these springs and lugs. A press-button 34 is provided biassed by means of a spring 35 which engages the plate 12. The button 34 has an initial position in which it extends between co-aligned apertures 36,37 formed in the central regions of the two squab elements 9,10. The button 34 may be depressed until it is no longer located within the aligned apertures 36,37 and the squab elements 9,10 will then move to a closed condition illustrated in FIGS. 11 and 12 to the open condition illustrated in FIGS. 13 and 14. Thus the button acts as a control element, and when the button has been pressed, the squab elements 9,10 move automatically to their extended position. The squab elements may be returned to their initial position simply by pressing inwardly the outer-most edges of the squab elements, thus moving the squab elements against the bias of the springs 19 and 25. When the squab elements have returned to the initial condition illustrated in FIG. 12, the button 34 will again engage the aligned apertures 36 and 37 to retain the squab elements in the retracted position illustrated in FIG. 12.

While the invention has been described with reference to two embodiments involving different control elements, one control element comprising the back 7 of the child-seat and the other comprising the press-button 34, it is to be appreciated that in further embodiments of the invention, control element may comprise other components for example, the underlying support 8 of the squab 6 of the child's seat, so that the squab elements 9,10 move to their extended positions as the child's seat is moved from its retracted position within the recess 4 to the extended position as shown in FIG. 1 of the accompanying drawings. Of course, further types of control element may be provided if desired.

Whilst the invention has been described with specific reference to a child-seat in which the width of the squab increases it is to be understood that, in certain circumstances, it may be desired to provide a child's seat in which the length of the squab increases when the child's seat is brought into the fully operative condition.

What is claimed is:

1. A seating arrangement for a motor vehicle, the seating arrangement comprising a primary seat for occupation by an adult comprising a squab and a back, a child's seat being incorporated in the back of the primary seat, and being movable from the retracted position in which the child-seat is accommodated within a recess formed in the back of the primary seat, to an operative position, the child-seat presenting a squab having squab elements incorporating a means for moving said squab elements from an initial position to an operative position, the overall size of the squab when the squab elements are in the operative position being greater than the size when the squab elements are in the initial position, and a control element coacting with said moving means for actuating the latter.

2. An arrangement according to claim 1 wherein the squab carries two squab elements which are each movable in a lateral sense relative to each other so that the overall width of the squab increases when said moving means is actuated.

3. An arrangement according to claim 2 wherein the squab elements are each associated with a spring providing a lateral bias to the squab element.

4. An arrangement according to claim 1 wherein the squab elements are each provided with means engaging a guide element to guide the squab elements in their movement.

5. An arrangement according to claim 4 wherein the guide element comprises a guide rod, and each squab element is provided with a lug engaging the guide rod.

6. An arrangement according to claim 1 wherein said moving means may be actuated by a further movement of the control element to move said squab elements from the operative position back to the initial position.

7. An arrangement according to claim 1 wherein the control element comprises a back for the child's seat, the back being pivotally mounted relative to the squab of the child's seat.

8. An arrangement according to claim 2 wherein each squab element is associated with a wire or cord or the like tending to draw the respective squab element to the initial or retracted position when tension is applied thereto, means being provided to apply tension to the cable in response to movement of the back of the child's seat away from the operative position thereof.

9. An arrangement according to claim 2 wherein the control element comprises a press-button initially engaged in two aligned apertures formed in the squab elements.

* * * * *